(12) United States Patent
Arvanites

(10) Patent No.: US 6,918,355 B1
(45) Date of Patent: Jul. 19, 2005

(54) DURABLE PET TOY

(76) Inventor: Margherita Jessie Arvanites, 15131 E. Palisades Blvd., Fountain Hills, AZ (US) 85268

( * ) Notice: Subject to any disclaimer, the term of this patent is extended or adjusted under 35 U.S.C. 154(b) by 2 days.

(21) Appl. No.: 10/694,562

(22) Filed: Oct. 27, 2003

(51) Int. Cl.[7] .............................................. A01K 29/00
(52) U.S. Cl. ..................................... 119/707; 119/709
(58) Field of Search ........................ 119/702, 707, 708, 119/709, 710, 711; 2/2.5; 442/135

(56) References Cited

U.S. PATENT DOCUMENTS

| | | | |
|---|---|---|---|
| 4,513,014 A | 4/1985 | Edwards | |
| 4,557,219 A | 12/1985 | Edwards | |
| 4,924,811 A | 5/1990 | Axelrod | |
| 4,936,809 A | 6/1990 | Auer et al. | |
| 5,237,961 A * | 8/1993 | Sarullo | 119/709 |
| 5,560,320 A | 10/1996 | Plunk | |
| 5,595,142 A | 1/1997 | Chill | |
| 5,797,353 A | 8/1998 | Leopold | |
| 5,911,197 A * | 6/1999 | Schmid | 119/712 |
| 6,240,879 B1 * | 6/2001 | Denesuk et al. | 119/709 |
| 6,319,864 B1 | 11/2001 | Hannigan et al. | |
| 6,490,998 B1 * | 12/2002 | Rocher | 119/707 |
| 6,602,811 B1 | 8/2003 | Rock et al. | |
| 6,615,766 B1 * | 9/2003 | Curry | 119/207 |
| 6,623,328 B1 * | 9/2003 | Theel | 119/707 |
| 6,663,457 B2 * | 12/2003 | Ritchey | 119/711 |

* cited by examiner

Primary Examiner—Teri P. Luu
Assistant Examiner—Elizabeth Shaw
(74) Attorney, Agent, or Firm—Mathew R. P. Perrone, Jr.

(57) ABSTRACT

A durable pet toy has a bullet resistant fabric therein, with a flexible material or a noise making material contained within the fabric, and a cover over the outer or surface portion of the bullet resistant fabric.

20 Claims, 2 Drawing Sheets

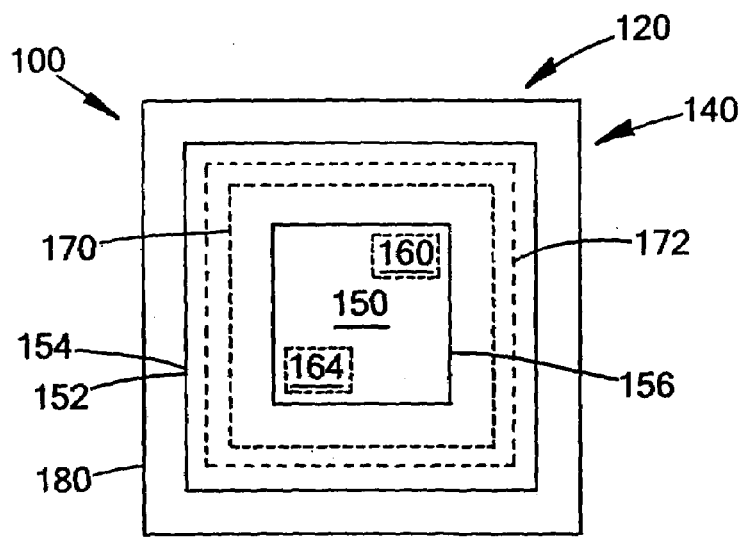
Fig.1.
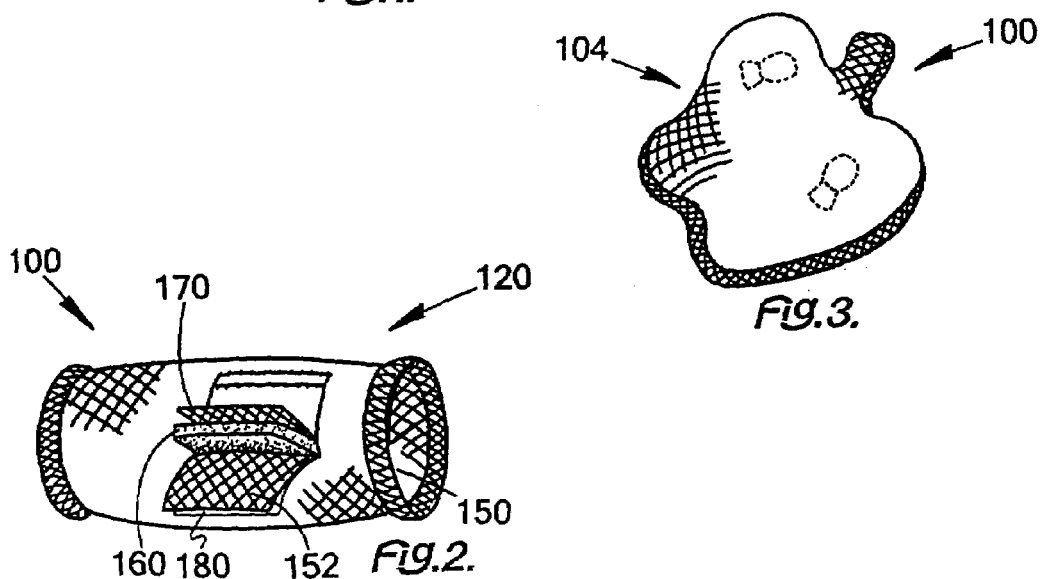
Fig.3.
Fig.2.

DURABLE PET TOY

This invention relates to a durable pet toy and more particularly to a durable pet toy which endures chewing and provides a decorative, entertaining pet toy.

BACKGROUND OF THE INVENTION

Most pet toys, especially toys for dogs, are chewed by the pet. As the toy is chewed, it suffers wear and tear. The wear and tear lead to a quick replacement of the toy. It also may cause injury to the pet as the toy disintegrates. Particles of the toy may be swallowed by the pet, with injurious results to the pet itself.

Yet such toys are a desirable attraction for pets. Not only does the toy entertain the pet; it also provides jaw exercise and stimulation to the teeth. Such a toy provides both entertainment and health factors. Yet, it is very difficult to provide a durable toy, an entertaining toy, and a safe toy.

Safety in a pet toy of the prior art must be sacrificed to achieve entertainment and durability. Likewise, a durable toy may be unsafe, in that it may be too hard to minimize damage to the jaw of the pet. Factoring in entertainment weakens the toy and compromises durability.

If a pet toy can be developed, which is durable while maintaining safety, and still providing both entertainment and exercise, great advantages can be obtained. However, such a pet toy is conspicuously unavailable

SUMMARY OF THE INVENTION

Among the many objectives of this invention is the provision of a durable pet toy, which provides entertainment, safety and exercise, simultaneously.

A further objective of this invention is the provision of a durable pet toy, utilizing a bullet resistant fabric.

Yet a further objective of this invention is the provision of a durable pet toy having a cover.

A still further objective of this invention is the provision of a durable pet toy having a noise making capability.

Yet another objective of this invention is the provision of a durable pet toy with a cover thereover.

Yet another objective of this invention is the provision of a durable pet toy with a flexible filling therein.

Still, another objective of this invention is the provision of a durable pet toy with a plurality of layers therein.

These and other objectives of the invention (which other objectives become clear by consideration of the specification, claims and drawings as a whole) are met by providing a durable pet toy having a bullet resistant fabric therein, with a flexible material or a noise making device or material contained within the fabric, and a cover over the outer or surface portion of the fabric. In a preferred form the noise making device emits a sound when the pet toy is compressed or squeezed by the pet through biting or other action.

BRIEF DESCRIPTION OF THE DRAWINGS

FIG. 1 depicts a block diagram 140 in order to show a structure for the pet toy 100 of this invention.

FIG. 2 depicts a perspective view of an inner sleeve 120, for the pet toy 100 of this invention.

FIG. 3 depicts a perspective view for the pet toy 100 of this invention in the shape of an apple 104.

Throughout the figures of the drawings, where the same part appears in more than one figure of the drawings, the same number is applied thereto.

DESCRIPTION OF THE PREFERRED EMBODIMENTS

Figure 4:
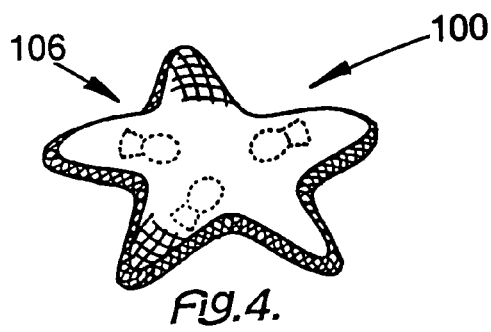
FIG. 4 depicts a perspective view for the pet toy 100 of this invention in the shape of a star 106.

A pet toy has a layer of a bullet resistant material, with a flexible material secured within the bullet resistant material, and a decorative cover concealing the bullet resistant material. The bullet resistant material is most preferably a woven fabric. With the bullet resistant material, durability is provided to the pet toy. The bullet resistant material contains the flexible material therein and substantially reduces any loss thereof. The decorative cover adds to a desired appearance for the toy.

Many suitable bullet resistant woven fabrics exist for the purposes of this invention. KEVLAR is a registered trademark of the E. I. Dupont Company of Wilmington, Del., which is a usable fabric for the bullet resistant woven fabric. Denier nylon is also both a usable fabric and the most preferred fabric for the bullet resistant woven fabric. Other bullet resistant woven fabrics may also be used.

Most preferably, denier nylon is the bullet resistant woven fabric used. Preferably, the denier nylon has a denier of 450 to 1800. More preferably, the denier nylon has a denier of 1500 to 1750. Most preferably, the denier nylon has a denier of 1650 to 1725. Typically, the durability of the pet toy increases as the denier increases. The purpose of the lower denier fabric is to provide a pet toy for a smaller pet with less strength, while a higher denier fabric is to provide a pet toy for a larger pet.

In a preferred fashion, at least two layers of denier nylon fabric with a fleece cover secured around the outer surface contains a flexible material between the layers while providing an inner chamber. The inner chamber may receive an appropriate noise making device or flexible material therein and be protected by the denier nylon fabric.

It is preferable to secure the bullet resistant material to itself in order to form the desired chamber for a noise making device or a noise maker, or foam material, or padding material to be received therein. The formation of the chamber is accomplished by gluing, sewing, heat sealing with and without adhesive, or another suitable fashion.

Preferably, the noise making device or the noise maker is activated by squeezing or pressure in order to add an entertainment factor to the toy for the pet. So as the pet chews on the toy, a noise is created by that force, which adds entertainment to the pet.

Due to its flexibility, the bullet resistant denier nylon fabric is the preferred fabric for use in this toy. Other bullet resistant flexible materials or fabric may also be used.

More particularly, the denier nylon has a woven texture and is suitable for forming bullet resistant devices. As these fabrics of denier nylon are layered, a fleece cover is stitched, glued or otherwise secured there around. Between the fabric layers, may be placed foam or a noise making device if desired.

Any suitable cover fabric, whether woven or non-woven may cover the bullet resistant fabric and the other contents of the pet toy. The preferred fabric is a fleece fabric, which is preferably cross stitched to be secured over the bullet resistant fabric. Any other securing method, including but not limited to sewing, gluing or sealing, is usable. This cross stitched fleece fabric gives the best product.

Typical flexible material or filling material for the pet toy includes a particulate material, a foam material or a fibrous material. Any number of fibrous or felt materials are known in the art, the flexible ones of which may be used in the pet toy of this invention. Cork may be used. Foamed poly styrene, foamed poly urethane and foamed poly imide are typical of the foamed items which may be used. The key requirement is that the flexible material or filling material not be injurious to a pet.

While it is not desired to be bound by any particular theory, the following postulate is offered for the durability of the pet toy of this invention. The denier nylon and its bullet resistant capability combine with the preferred cross stitched fleece material to provide an extremely durable pet toy, which provides the animal substantial pleasure and proves to be long lasting.

Referring now to FIG. 1, block diagram 140 for durable pet toy 100 has an inner sleeve 120 with an outer first material layer 152, with a chamber 150 formed by the first material layer 152 of bullet resistant woven fabric 154. Chamber 150 may be formed by gluing, sealing, or otherwise adhering edges 156 of fabric 154 together.

Within the chamber 150, may be placed flexible material 160. Also, within the chamber 150 may be placed a noisemaker 164, which is activated by pressure from a pet's jaw (not shown). Combinations of flexible material 160 and noisemaker 164, may also be used thanks to the strength of first material layer 152.

Adding FIG. 2 to the consideration, second material layer 172 may also be used to form a sandwich structure around chamber 150 with the same or different flexible material 160 between first material layer 152 and second material layer 172. Fleece cover 180 fits over first material layer 152.

Bullet proof material layer 172 may provide a third material layer or more for pet toy 100 if desired. Probably, three such layers are the desired limit of layers for woven bullet resistant fabric in the pet toy.

First material layer 152, by itself, or with second material layer 172 as described above provides strength for this toy. The fabric nature provides flexibility, while the bulletproof nature provides durability. By arranging first material layer 152 with or without second material layer 172, the structure with the fleece cover 180 on the exterior the desired material on the interior an effective pet toy for durable pet toy 100 is produced.

Figure 5:
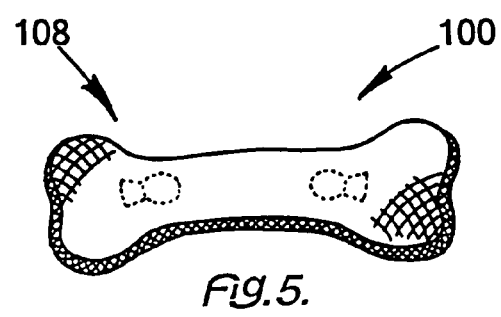
FIG. 5 depicts a perspective view for the pet toy 100 of this invention in the shape of a bone 108.
Figure 6:
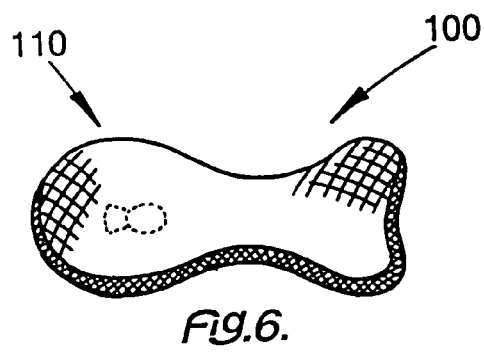
FIG. 6 depicts a perspective view for the pet toy 100 of this invention in the shape of a fish 110.
Figure 7:
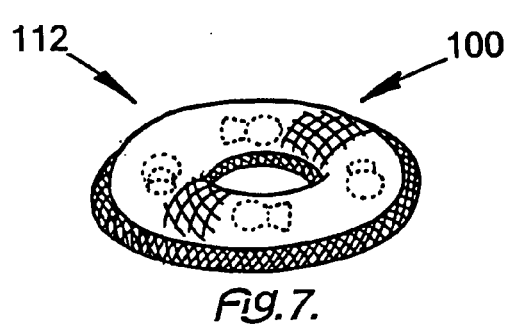
FIG. 7 depicts a perspective view for the pet toy 100 of this invention in the shape of a donut 112.
Figure 8:
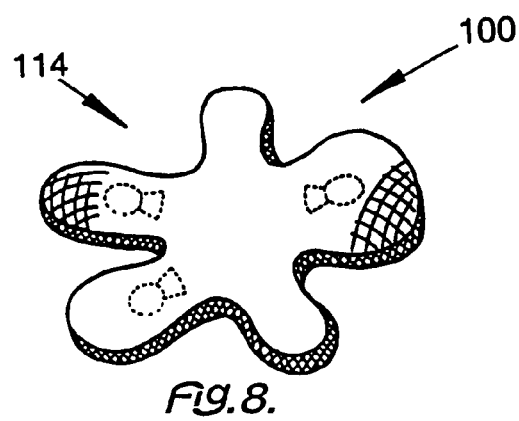
FIG. 8 depicts a perspective view for the pet toy 100 of this invention in the shape of a human 114.
Figure 9:
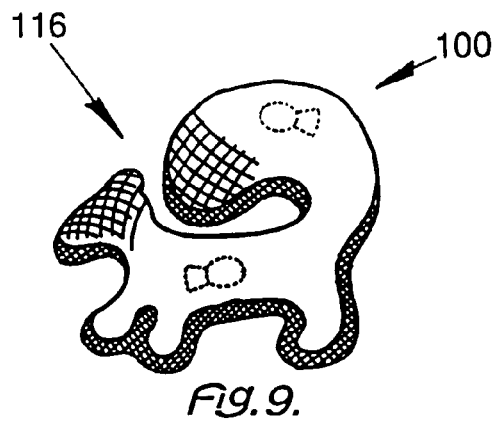
FIG. 9 depicts a perspective view for the pet toy 100 of this invention in the shape of a squirrel 116.

FIG. 3 with its apple 104, FIG. 4 with its star 106, FIG. 5 with its bone 108, FIG. 6 with its fish 110, FIG. 7 with its donut 112, FIG. 8 with its human shape 114, FIG. 9 with its squirrel 116 depicts various suitable shapes for pet toy 100 without unduly limiting the shapes of this invention.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A durable pet toy comprising:
   (a) a bullet resistant fabric forming an exterior surface of an inner chamber;
   (b) a flexible material or a noise making material being contained within the inner chamber; and
   (c) a decorative cover enclosing the exterior surface and concealing the bullet resistant material.

2. The durable pet toy of claim 1 further comprising:
   (a) the bullet resistant fabric providing durability for the pet toy;
   (b) the bullet resistant fabric being a denier nylon; and
   (c) the decorative cover being a fleece cover secured around the exterior surface.

3. The durable pet toy of claim 2 further comprising:
   (a) the bullet resistant fabric having a first layer forming the exterior surface and a second layer;
   (b) the first layer forming the exterior surface;
   (c) the second layer being positioned between the first layer and the inner chamber; and
   (d) a flexible layer of material between the first layer and the second layer.

4. The durable pet toy of claim 3 further comprising:
   (a) the inner chamber receiving at least one item selected from the group consisting of a noise making device and a flexible material; and
   (b) the denier nylon having a denier of 450 to 1800.

5. The durable pet toy of claim 4 further comprising the denier nylon having a denier of 1500 to 1750.

6. The durable pet toy of claim 5 further comprising the denier nylon having a denier of 1650 to 1725.

7. The durable pet toy of claim 2 further comprising:
   (a) the inner chamber receiving at least one item selected from the group consisting of a noise making device and a flexible material;
   (b) at least a third layer between the inner chamber and second layer; and
   (c) the denier nylon having a denier of 1400 to 1800.

8. The durable pet toy of claim 7 further comprising the group the denier nylon having a denier of 1500 to 1750.

9. The durable pet toy of claim 8 further comprising the group the denier nylon having a denier of 1650 to 1725.

10. The durable pet toy of claim 9 having a shape selected from the group consisting of an apple shape, a star shape, a bone shape, a fish shape, a donut shape, a human shape, and a squirrel shape.

11. A method for making a durable pet toy comprising:
    (a) forming an inner chamber from a bullet resistant woven fabric;
    (b) filling the inner chamber with a flexible material;
    (c) closing the inner chamber with the flexible material therein; and
    (d) providing an inner surface for the inner chamber and an outer surface for the inner chamber, the inner surface being oppositely disposed from the outer surface;
    (e) contacting the flexible material with the inner surface; and
    (f) covering the outer surface with a decorative cover.

12. The method of claim 11 further comprising:
(a) adding a noise making device to the flexible material;
(b) providing a fleece covering for the decorative cover; and
(c) concealing the bullet resistant woven fabric.

13. The method of claim 11 further comprising:
(a) adding at least a second layer of the bullet resistant woven fabric between the inner surface and the flexible material;
(b) providing a fleece covering for the decorative cover;
(c) gluing the bullet resistant woven fabric to form the chamber.

14. The method of claim 13 further comprising adding a noise making device to the flexible material.

15. The method of claim 11 further comprising:
(a) adding a second layer of the bullet resistant woven fabric between the inner surface and the flexible material;
(b) providing a fleece covering for the decorative cover;
(c) sealing the bullet resistant woven fabric to form the chamber.

16. The method of claim 15 further comprising adding a noise making device to the flexible material.

17. A durable pet toy comprising:
(a) a bullet resistant fabric forming an exterior surface of an inner chamber;
(b) a flexible material or a noise making material contained within the inner chamber;
(c) a decorative cover covering the exterior surface and concealing the bullet resistant material;
(d) the bullet resistant fabric providing durability for the pet toy;
(e) the bullet resistant fabric being a denier nylon;
(f) the decorative cover being a fleece cover secured around the exterior surface;
(g) the inner chamber receiving at least one item selected from the group consisting of a noise making device and a flexible material;
(h) the denier nylon having a denier of 1550 to 1600;
(i) the inner chamber receiving at least one item selected from the group consisting of a noise making device and a flexible material; and
(j) the decorative cover being secured by gluing, cross stitching, sewing or sealing.

18. The durable pet toy of claim 17 further comprising:
(a) the bullet resistant fabric having a first layer forming the exterior surface and a second layer;
(b) the first layer forming the exterior surface;
(c) the second layer being positioned between the first layer and the inner chamber; and
(d) a flexible layer of material between the first layer and the second layer.

19. The durable pet toy of claim 18 further comprising the decorative cover being a cross stitched fleece cover.

20. The durable pet toy of claim 17 further comprising the decorative cover being a cross stitched fleece cover.

* * * * *

(12) INTER PARTES REEXAMINATION CERTIFICATE (0453rd)
United States Patent
Arvanites

(10) Number: US 6,918,355 C1
(45) Certificate Issued: Sep. 18, 2012

(54) DURABLE PET TOY

(76) Inventor: Margherita Jessie Arvanites, Fountain Hills, AZ (US)

Reexamination Request:
No. 95/001,507, Dec. 27, 2010

Reexamination Certificate for:
Patent No.: 6,918,355
Issued: Jul. 19, 2005
Appl. No.: 10/694,562
Filed: Oct. 27, 2003

(51) Int. Cl.
*A01K 29/00* (2006.01)

(52) U.S. Cl. .......................... 119/707; 119/709

(58) Field of Classification Search .................. None
See application file for complete search history.

(56) References Cited

To view the complete listing of prior art documents cited during the proceeding for Reexamination Control Number 95/001,507, please refer to the USPTO's public Patent Application Information Retrieval (PAIR) system under the Display References tab.

*Primary Examiner*—Jeanne M Clark

(57) ABSTRACT

A durable pet toy has a bullet resistant fabric therein, with a flexible material or a noise making material contained within the fabric, and a cover over the outer or surface portion of the bullet resistant fabric.

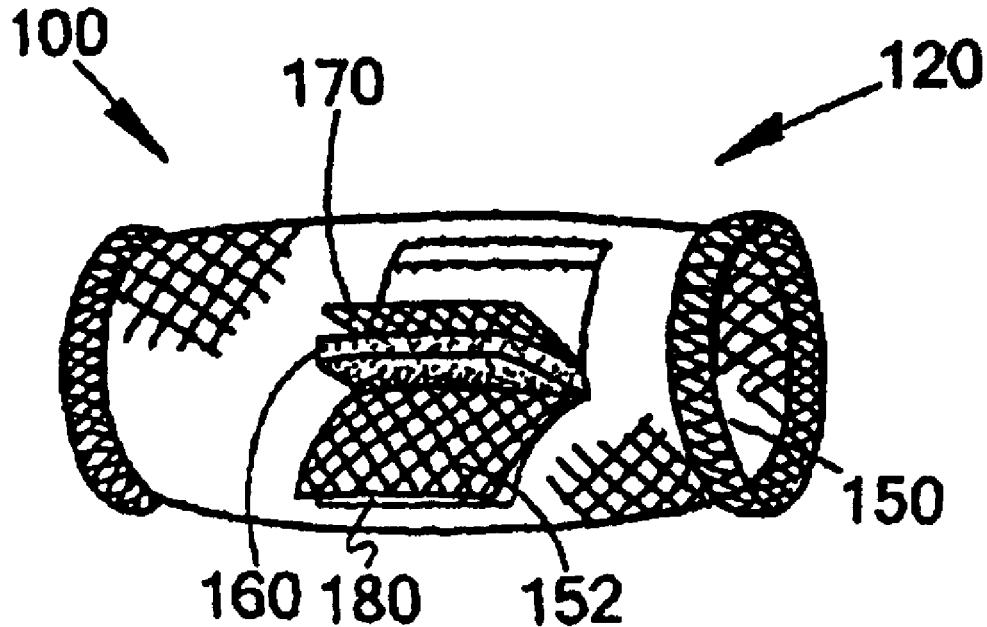

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3-6 is confirmed.

Claims 1, 2, 11-17 and 20 are cancelled.

Claims 7-9 and 18 are determined to be patentable as amended.

Claims 10 and 19, dependent on an amended claim, are determined to be patentable.

7. The durable pet toy of claim [2] *3* further comprising:
   (a) the inner chamber receiving at least one item selected from the group consisting of a noise making device and a flexible material;
   (b) at least a third layer between the inner chamber and *the* second layer; and
   (c) the denier nylon having a denier of 1400 to 1800.

8. The durable pet toy of claim 7 further comprising [the group] the denier nylon having a denier of 1500 to 1750.

9. The durable pet toy of claim 8 further comprising [the group] the denier nylon having a denier of 1650 to 1725.

18. [The] *A* durable pet toy [of claim 17 further] comprising:
   (*a*) *a bullet resistant fabric forming an exterior surface of an inner chamber;*
   (*b*) *a flexible material or a noise making material contained within the inner chamber;*
   (*c*) *a decorative cover covering the exterior surface and concealing the bullet resistant material;*
   (*d*) *the bullet resistant fabric providing durability for the pet toy;*
   (*e*) *the bullet resistant fabric being a denier nylon;*
   (*f*) *the decorative cover being a fleece cover secured around the exterior surface;*
   (*g*) *the inner chamber receiving at least one item selected from the group consisting of a noise making device and a flexible material;*
   (*h*) *the denier nylon having a denier of 1550 to 1600; and*
   (*i*) *the decorative cover being secured by gluing, cross stitching, sewing or sealing;*
   [(a)] *wherein the durable pet toy further comprises* the bullet resistant fabric having a first layer forming the exterior surface and a second layer; [(b) the first layer forming the exterior surface; (c)] the second layer being positioned between the first layer and the inner chamber; and [(d)] a flexible layer of material between the first layer and the second layer.

* * * * *